Sept. 2, 1952  F. W. WILKENING ET AL  2,609,259
PISTON RING
Filed June 3, 1948  6 Sheets-Sheet 1
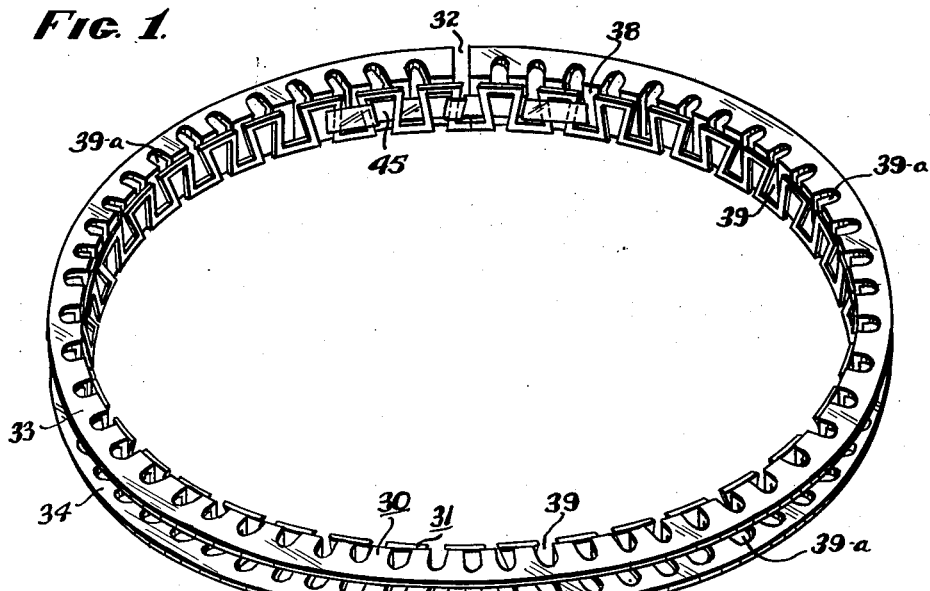
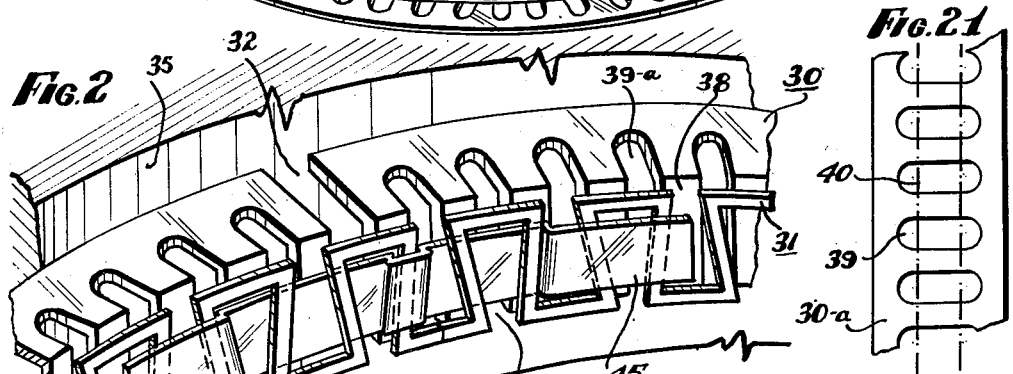
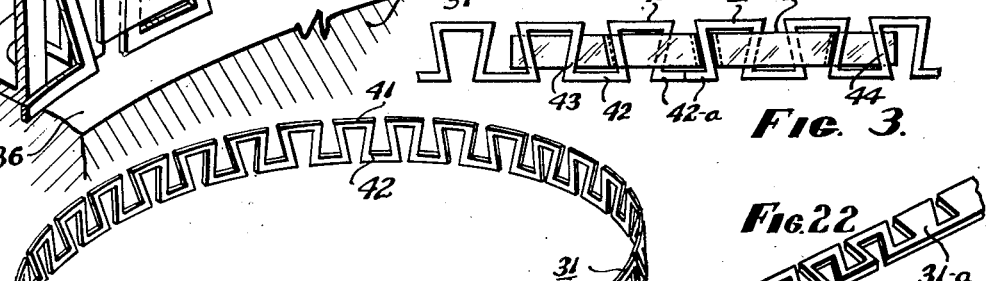
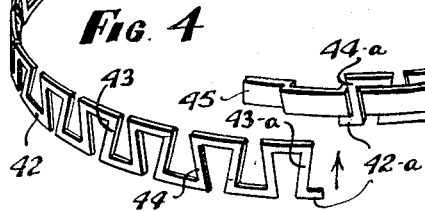
INVENTORS
Frederick W. Wilkening
Helmuth G. Braendel
Carl F. Engelhardt
BY Leonard L. Kalish
Attorney Sept. 2, 1952 F. W. WILKENING ET AL 2,609,259
PISTON RING
Filed June 3, 1948 6 Sheets-Sheet 4

INVENTORS
Frederick W. Wilkening
Helmuth G. Braendel
Carl F. Engelhardt
BY Leonard L. Kalish
Attorney

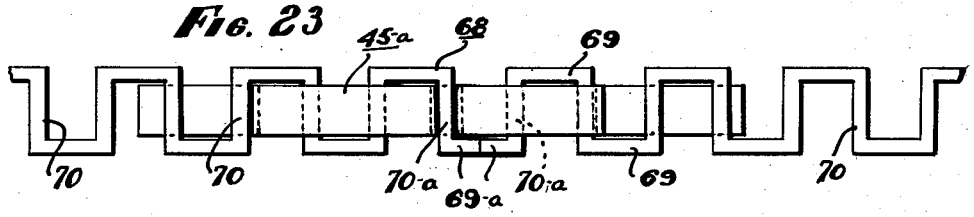
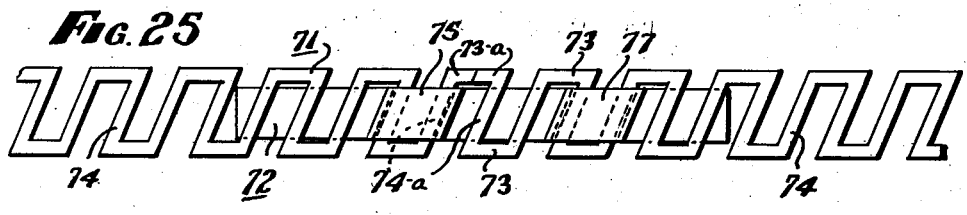
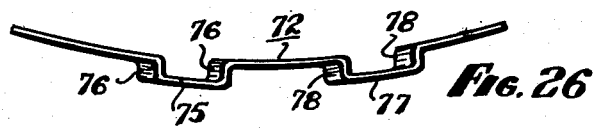
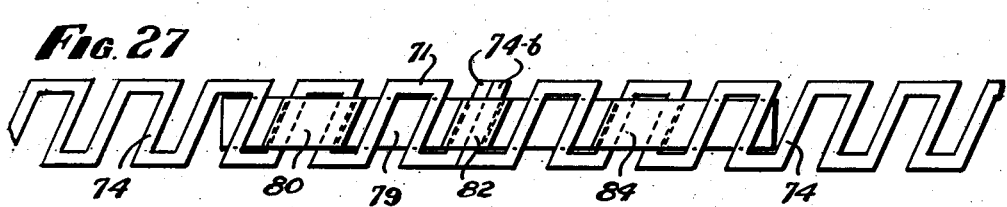
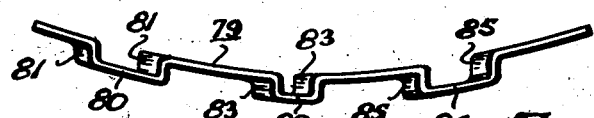

Sept. 2, 1952 F. W. WILKENING ET AL 2,609,259
PISTON RING
Filed June 3, 1948 6 Sheets-Sheet 6
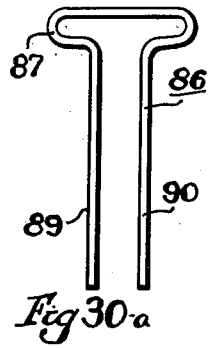
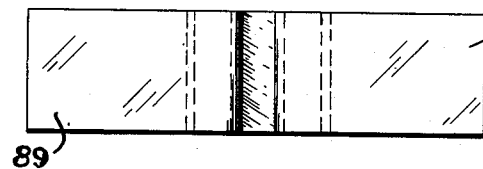
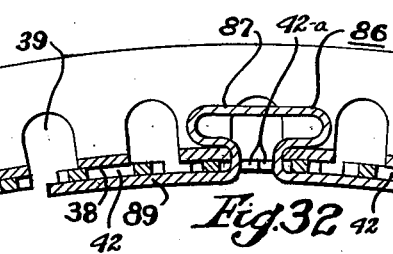
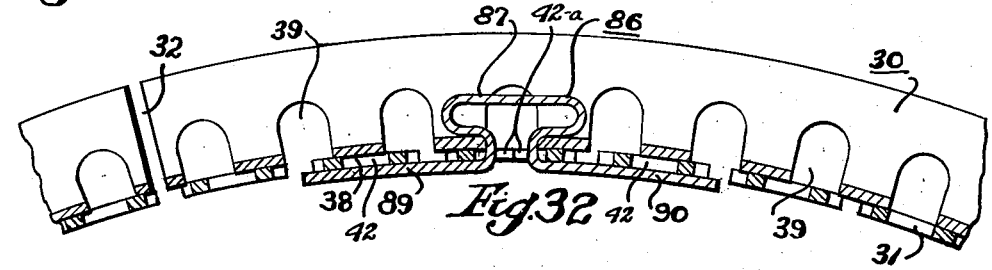
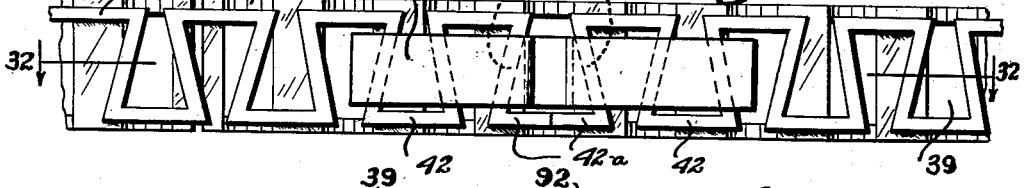
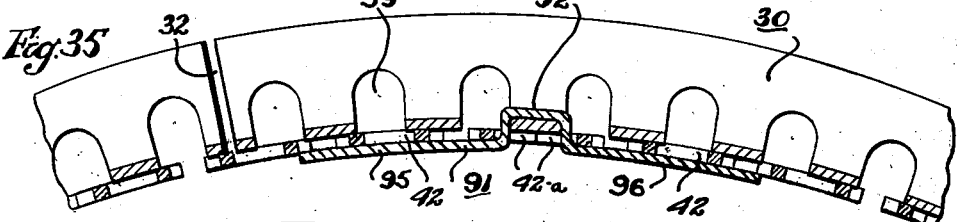
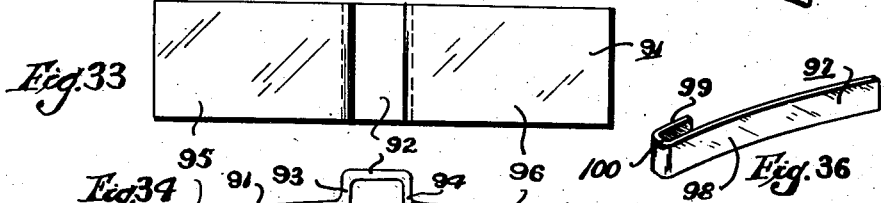
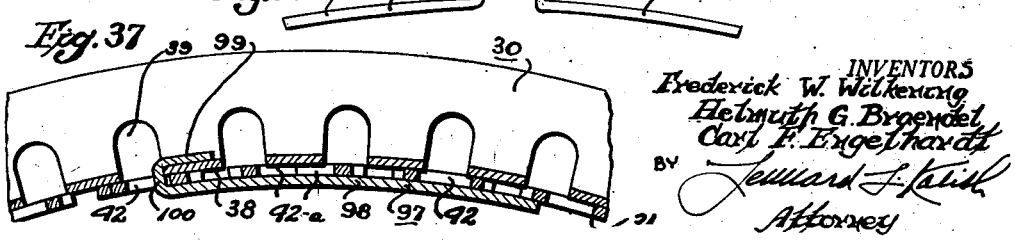
INVENTORS
Frederick W. Wilkening
Helmuth G. Broendel
Carl F. Engelhardt
BY
Leonard L. Kalish
Attorney Patented Sept. 2, 1952

2,609,259

UNITED STATES PATENT OFFICE 2,609,259

PISTON RING

Frederick W. Wilkening, Penn Valley, Helmuth G. Braendel, Paoli, and Carl F. Engelhardt, Yeadon, Pa., assignors to Wilkening Manufacturing Company, Philadelphia, Pa., a corporation of Delaware Application June 3, 1948, Serial No. 30,938

12 Claims. (Cl. 309—45)

The present invention relates to piston-rings for use in internal-combustion engines, diesel engines, compressors, pumps or the like and it relates more particularly to expander-springs for such piston-rings.

An object of the present invention is to provide a new improved construction for piston-ring expanders. Another object of the present invention is to provide a free-floating non-bottoming expander for piston-rings or the like which can be simply and inexpensively manufactured and which can be installed within a piston-groove quickly and easily and which provides effective, more or less uniform, radially-outward tension for a non-resilient piston-ring. A further object of the present invention is to provide a new and improved connector member for use with piston-ring expanders of the thin flat axially-corrugated metallic-ribbon type, which will permit the quick and easy connection of the free ends of the expander into a generally continuous annulus imparting more or less uniform radially-outward tension to the piston-ring.

Other objects and advantages of the present invention are apparent in the following detailed description, appended claims and accompanying drawings.

It has been suggested in the past to provide expander-springs for piston-rings or the like consisting of a continuously axially-corrugated annulus formed of a strip of relatively thin spring material having its ends held in abutting relationship so as to provide a free-floating ring which does not "bottom" (that is, contact the inner or back wall of the piston-groove) and which will provide substantially uniform radially-outward pressure when installed behind a non-resilient piston-ring, in a piston-groove and within a cylinder. See Patent 2,293,450, issued August 18, 1942.

While the structure of Patent 2,293,450 has proven extremely effective during operation, especially in conjunction with oil-control piston-rings, it has been rather difficult to install on a piston due to the problem of securing the free ends of the spring. Where the free ends have been fastened in advance, as for example by butt-welding or by using a crimped sleeve, it is frequently difficult to slip the closed annulus over the piston-head to get it into the groove without permanently distorting or stretching it beyond its elastic limit.

Where, on the other hand, the ends have been left free with the purpose of connecting them after the expander has been placed in the groove, it is a difficult and trying operation for a mechanic, whose hands are slippery with grease or the like, to capture the elusive free ends of the expander-spring and to hold them in juxtaposition while a welding or crimping or other operation is performed.

According to the present invention, there has been developed a new and improved expander-spring construction which permits the use of thin flat spring metal to provide a free-floating non-bottoming piston-ring support, whose ends can be connected, after the spring has been placed in the piston-groove, quickly and easily and with a minimum of time and effort.

Generally speaking, the present invention contemplates an expander-spring of more or less continuously axially-corrugated relatively thin spring material, one of whose free ends is more or less permanently secured (prior to installation on the piston) to a connector-clip or saddle or the like which is also provided with means permitting the other free end of the expander-spring to be connected thereto quickly and easily and which will hold the free ends of the expander-spring firmly and positively in adjacent relationship so as to maintain the expander-spring in the form of a more or less continuous closed annulus.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Fig. 1 represents a perspective view of one embodiment of the present invention shown in assembled position.

Fig. 2 represents a fragmentary perspective view, on an enlarged scale, showing the appearance of the expander and saddle of Fig. 1.

Fig. 3 represents an elevational view showing the appearance of the outer side of that portion of the expander and saddle shown in Fig. 2, but shown without the ring.

Fig. 4 represents an outside perspective view indicating the manner of installing the saddle on one end of the expander strip preliminary to assembling of the expander.

Fig. 21 represents a fragmentary plan view showing the sheet-metal "blank" for forming the outer ring of Fig. 1.

Fig. 22 represents a fragmentary perspective view showing one manner of forming the expander-spring of Fig. 4 from a resilient sheet-metal "blank."

Fig. 23 represents an outside elevational view generally similar to that of Fig. 3 but showing still another embodiment of the present invention employing a differently-corrugated expander spring and a correspondingly modified saddle or clip.

Fig. 24 represents a top plan view like that of Fig. 6 but showing the saddle or clip of Fig. 23.

Fig. 25 represents an outside elevational view like that of Fig. 3 but showing a further modified form of expander spring and a saddle or clip adapted to hold the free ends thereof.

Fig. 26 represents a top plan view like that of Fig. 6 but showing the saddle or clip of Fig. 25.

Fig. 27 represents an outside elevational view showing generally the same type of expander spring as in Fig. 25 but showing a modified form of saddle or clip therefor.

Fig. 28 represents a top plan view like that of Fig. 6 but showing the saddle or clip of Fig. 27.

Fig. 29 represents a front elevational view of still another form of clip.

Fig. 30 represents a top plan view of the embodiment of Fig. 29.

Figure 5:
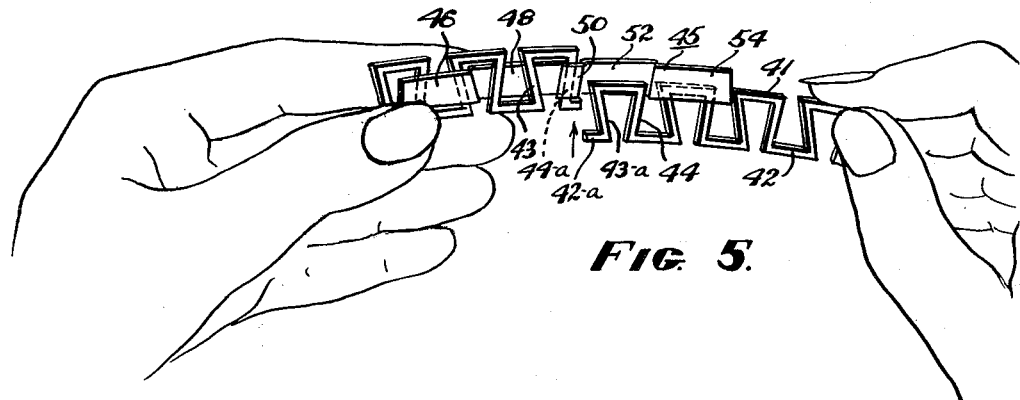
Fig. 5 represents a fragmentary inside perspective view indicating the manner of completing the assembly by fastening the saddle to the other end of the expander strip.

Fig. 30-a represents a top plan view of the clip of Fig. 30 but showing an intermediate stage of formation wherein the legs 89 and 90 extend parallel to each other.

Fig. 31 represents an elevational view of a ring-and-expander assembly employing the clip of Figs. 29 and 30, shown as it appears from the inside of the assembled piston-ring.

Fig. 32 represents a horizontal cross-sectional view generally along the line 32—32 of Fig. 31.

Figs. 33 and 34 represent views like those of Figs. 29 and 30 but showing a further modified form of clip.

Fig. 35 represents a horizontal cross-sectional view generally like that of Fig. 32 but showing the clip of Figs. 33 and 34.

Fig. 36 represents a perspective view of still another form of connector-clip or saddle.

Fig. 37 represents a fragmentary cross-sectional view generally like that of Fig. 32 but showing the connector-clip of Fig. 36.

In one embodiment of the present invention shown generally in Figure 1, we may provide a composite two-piece oil-control piston-ring made up of a ring 30 of flexible but non-resilient sheet-metal or the like, and an expander-spring 31 of resilient metal or the like.

The ring 30 is an integrally-formed trans-split annulus having a gap 32 and consists of top and bottom radially-extending axially-spaced flanges or lands 33 and 34 respectively, whose outer peripheral edges serve to contact the cylinder wall 35 when the piston-ring is installed within the groove 36 of a piston 37.

The ring 30 also includes a back or inner wall 38 extending axially intermediate the top and bottom walls of flanges 33 and 34.

A plurality of circumferentially-distributed oil-drain openings or slots 39 are provided in the ring 30; the openings 39 extending axially along the back wall 38 and also having radially-extending portions 39-a extending outward for approximately two-thirds of the radial dimension of the flanges 33 and 34 as shown particularly in Figures 1 and 2.

The ring 30 may be formed from an elongated strip of thin flat sheet-metal (as for example sheet-steel), which is flexible but not resilient.

As shown in Figure 21, the ring 30 may be formed from an elongated "blank" 30-a, in which the slots 39 are first punched, after which the "blank" is formed into its U-shaped cross-sectional configuration by bending along the lines 40 using any appropriate bending-rolls (not shown). Thereafter, the folded strip is helically coiled and subjected to suitable heat-treating operations, followed by an axial splitting operation to provide a number of trans-split annuli which may then be subjected to appropriate grinding operations and further heat-treatment (if desired).

The expander-spring 31 is an integrally-formed axially-corrugated strip of resilient metal or the like which may be formed by bending a length of wire as shown in Patent 2,293,450 or by stamping the corrugations from a sheet-metal "blank" 31-a as shown in Fig. 22, in a manner more fully disclosed in Frederick W. Wilkening's co-pending application Serial No. 667,181, filed May 3, 1946, now Patent No. 2,564,744, August 21, 1951, or in other ways which will be apparent to those skilled in the art.

The expander-spring 31 may be angularly-corrugated as shown in Figs. 1–5 so as to provide top and bottom longitudinally-extending portions or legs 41 and 42 and intervening portions or legs 43 and 44 which extend generally axially or transversely of the expander-strip but are oppositely inclined relative to each other so as to give a more or less triangular configuration; the legs 41, 43, 42 and 44 (in that order) forming acute angles at their junctures.

However, the present invention is not limited to this particular configuration for the axially-corrugated expander and it is contemplated that various other type of corrugations (as for example those shown in Figs. 23 and 25 or in Patent 2,293,450) may be used instead.

The punching operation shown in Fig. 22 (or the wire-bending operation referred to hereinabove) results in an elongated ribbon of transversely-corrugated resilient metal or the like which is then formed into individual expander strips which have a curvature corresponding generally to that of the piston-ring.

In the embodiment of Figs. 1–5, the individual strips are formed by cutting appropriately-spaced bottom legs 42 so as to leave the free ends of the strip with fragmentary longitudinally-extending lower legs 42–a protruding oppositely from the end-most transverse legs 43–a and 44–a.

It is necessary, in assembling the piston-ring expander, to tie the free ends of the expander together to prevent them from being displaced from their generally abutting relationship as indicated in Fig. 2.

Figure 6:
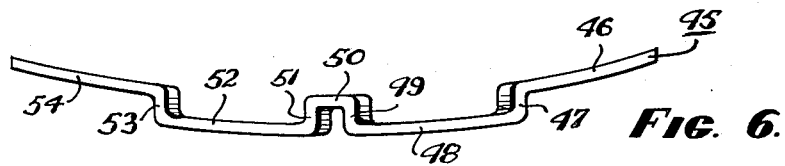
Fig. 6 represents a top plan view, on an enlarged scale, showing the saddle of Figs. 1–5.
Figure 7:
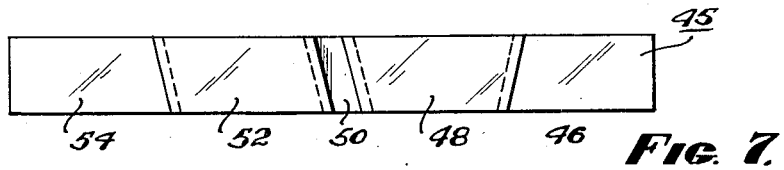
Fig. 7 represents a front elevational view of the saddle of Fig. 6.

In the embodiment of Figs. 1–5, this is effected by providing a saddle or clip 45 which, as shown particularly in Figs. 6 and 7, is simply an elongated strip of relatively thin sheet-metal or the like which is relatively form-retaining and which is usually somewhat resilient and slightly longitudinally curved, as shown in Fig. 6, so that it conforms generally to the curvature of the final expander-spring.

The saddle or clip 45 has a somewhat smaller transverse dimension than the expander strip and, preferably, is so dimensioned that it can be "threaded" around the transverse legs 43 and 44 while providing a slight transverse clearance relative to the top and bottom legs 41 and 42, as indicated particularly in Fig. 3.

As indicated particularly in Figs. 6 and 7, the saddle or clip 45 is provided with corrugations or bridging portions intended to mesh with the transversely-extending legs 43 and 44 so as to provide a connection for the free ends of the strip.

Reading from right to left in Fig. 7, the saddle or clip 45 is provided with a portion 46 which is adapted to fit behind and inward of a pair of transversely-extending legs 44 and 43 in the manner indicated in Fig. 5. At the inner end of the right-end portion 46, the saddle 45 is provided with an outwardly-extending shoulder 47 which is inclined (downward from right to left) so that it fits snugly against the correspondingly inclined transverse leg 43. Extending from the shoulder 47 is a bridging portion 48 which is adapted to pass across the outside of the next adjoining transverse legs 44 and 43. Portion 48 terminates just short of the next successive transverse leg (which is the end-leg 44–a) at which point an inwardly-extending shoulder 49, a longitudinally-extending shoulder 50 and an outwardly-extending shoulder 51 form a bridging groove which fits around and encompasses the side edges and the inner edge of the free transverse leg 44–a; the shoulders 49 and 51 being inclined (downward from left to right in Fig. 7) to conform to the inclination of the leg 44–a.

Extending toward the left from the shoulder 51, the saddle 45 is provided with a bridging portion 52 adapted to pass across the outside of the free leg 43–a and the successive axial leg 44, at which point an inwardly extending shoulder 53 is formed; the shoulder 53 being inclined (downwardly from left to right in Fig. 7) so as to lie adjacent the side edge of the leg 44.

Extending from the shoulder 53 is a left-hand portion 54 which is adapted to pass along the inner side of the next adjoining legs 43 and 44.

In installing the composite piston ring of the present invention within the groove of a piston, the operation is usually carried on in two steps, namely, first the installation of the expander spring 31 and next the installation of the ring 30.

In installing the expander spring 31, the saddle 45 is first affixed to one of the free ends of the corrugated strip in the manner shown in Figure 4 so that the right hand end of the saddle 45 is firmly attached to the expander strip (the tension or form-retaining properties of the saddle serving to provide frictional engagement between the saddle and the expander and thereby to resist displacement) with the left hand end of the saddle 45 (namely the portions 52 and 54 and the intervening shoulder 53) extending beyond the free axial leg 44–a and more or less in continuation of the free end of the corrugated strip.

The expander strip is then positioned within the piston groove and is held as indicated in Figure 5, with one hand grasping the interlocked portion of the saddle 45 and the expander strip 31 and with the other hand grasping the expander spring adjacent the other free end thereof.

The protruding portion of the saddle 45 and the other free end of the corrugated strip are then brought more or less into alignment as indicated in Figure 4, after which one or the other is moved so as to bring said protruding free end of the saddle into engagement with the other end of the expander strip so as to lock the two free ends into a more or less continuous annulus. As indicated particularly in Figure 5, during this relative movement of the protruding portion of the saddle and the free end of the expander strip, the inclined shoulder 53 is moved into juxtaposition with the leg 44 adjoining the free leg 43–a so that the portion 52 lies outside the expander strip and the portion 54 lies inside the expander strip.

In this way the free ends of the strip will be confined by the saddle into a more or less uniform and continuous annulus, the inherent resilience of which tends to force the free ends outward and against the saddle and thereby to ensure a firm frictional engagement therewith.

After the expander spring 31 has thus been installed within the piston groove 36, the ring 30 is manually distended so as to enlarge its gap 32 sufficiently to permit it to be slipped over the piston, after which it is manually closed to more or less its original gap size so that it surrounds and rests against the annular expander spring 31 which thereby provides resilient internal support therefor.

Any conventional tool is then used to install the piston within the cylinder.

The ring and expander are so dimensioned relative to the cylinder that the cylinder wall 35 confines the ring 30 in more or less the position shown in Figures 1 and 2, wherein the expander spring exerts a more or less uniform radially outward pressure around the periphery of the flexible but non-resilient ring 30; thereby ensuring a generally uniform pressure pattern of the ring-lands 33 and 34 against the cylinder wall.

At the same time, the flexibility of the ring 30 permits it to adapt itself to slight irregularities or "out-of-roundness" in the cylinder wall (such as are occasioned by wear) so as to minimize "blow-by" or loss of compression, and oil-consumption.

Since the preliminary installation of the saddle or clip 45 on one end of the expander strip (as shown in Figure 4) can be done in advance of the actual installation of the piston-ring within the piston-groove, it is apparent that only relatively simple operations are required during the actual assembly. In other words, all that the mechanic has to do is to position the two free ends of the expander strip within the groove in the manner shown in Figure 5 and then manipulate them to connect the protruding portion of the expander with the other free end of the ring. This manipulation can be done simply by "feel" and without the need for actually watching the two parts. Thus, the fact that the mechanic's hands may be greasy or that the piston may be in a relatively inaccessible position, does not seriously hinder the installation of the expander spring.

The subsequent installation of the ring 30 is, of course, an elementary step which can be accomplished without any difficulty whatever.

It is apparent, therefore, that the construction described hereinabove can be readily installed without the need for intricate or complex operations and, as a result, the time required for such installation is reduced to a fraction of the time required for other types of flexible piston rings.

Moreover, as mentioned hereinabove, the expander spring 31, when assembled and installed, is a "free-floating" non-bottoming annulus which depends upon inherent tension and does not "bottom" against the inner or back wall of the cylinder groove. In this way, there is no need for accurately dimensioning the radial depth of the ring and expander relative to the cylinder groove in order to assure proper ring-pressure.

Thus, it is obvious from the foregoing that, according to the present invention, it is possible to provide a simple and inexpensive piston ring (which can be manufactured quickly and easily from inexpensive materials, by mass-production methods) which can be installed quickly and easily and with a minimum of labor time, and which will operate effectively over a long period of time, as an efficient oil control piston-ring.

In Figures 8–11, I have shown another embodiment of the present invention wherein a modified form of saddle or clip 55 is employed.

The saddle 55 is simpler in construction than the saddle 45 described hereinabove in that, as shown particularly in Figures 8 and 9, it is made up of a right end portion 56, a shoulder 57, extending transversely and outwardly from the inner edge of the end 56, a central portion 58, extending longitudinally from the shoulder 57, a shoulder 59, extending transversely and inwardly from the other end of the central portion 58, and a left end portion 60; the shoulders 57 and 59 being inclined downwardly and to the left when viewed from the outside of the saddle as in Figure 9.

Figure 8:
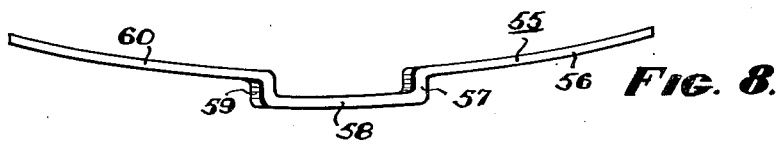
Fig. 8 represents a top plan view of a simplified form of expander saddle having only a single corrugation.

As indicated particularly in Figure 8, the portions 56, 58 and 60 are somewhat curved so that they correspond generally to the curvature of the final assembled expander spring.

Figure 10:
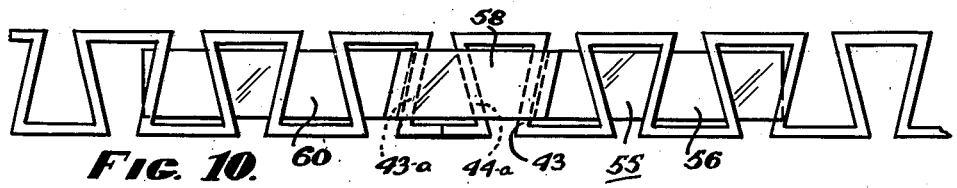
Fig. 10 represents a fragmentary front elevational view showing the method of assembling an expander employing the saddle of Figs. 8 and 9.
Figure 11:
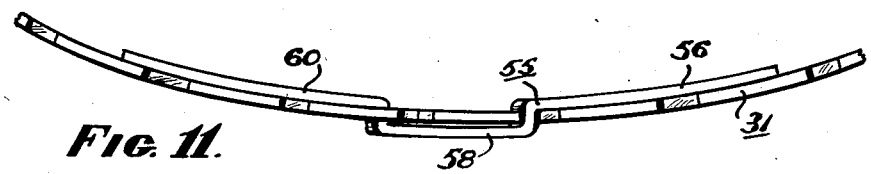
Fig. 11 represents a fragmentary plan view showing the sadle of Figs. 8 and 9 installed upon an expander.

As shown particularly in Figure 10, the shoulder 59 is adapted to seat against the side of the end leg 43–a while the shoulder 57 is adapted to seat against the side of the leg 43 adjoining the end leg 44–a; the central portion 58 being adapted to pass across the outside of the legs 43–a, 44–a and 43 whereas the end portions 54 and 56 pass underneath the next adjoining three transverse legs on either side of the gap.

The expander spring 31 and saddle 55 are assembled within a piston groove in a manner analogous to that described hereinabove in connection with the embodiment of Figure 1. Thus, the saddle is preliminarily installed upon one of the free ends of the expander strip which is then positioned around the groove with the fingers, as shown in Figure 5, after which the protruding portion of the saddle is moved axially into engagement with the other free end of the expander spring so as to lock the two free ends in juxtaposed relationship. It should be noted, however, that, with this simplified form of saddle, there is no positive lock analogous to that shown in Figure 4 so that the free end 56 (or 58) must be held firmly against the inner side of the expander spring to prevent it from coming off or being displaced preliminary to the completion of the final assembly.

Figure 12:
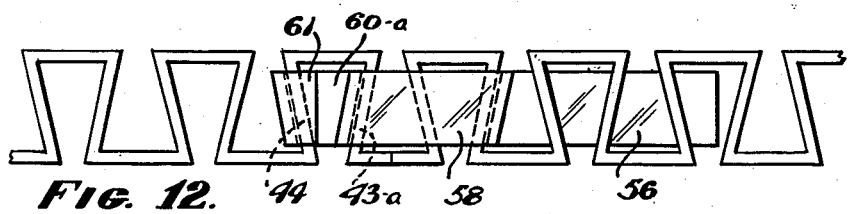
Fig. 12 represents an elevational view like that of Fig. 10 but showing a modification wherein one end of the saddle is permanently secured to the expander.
Figure 13:
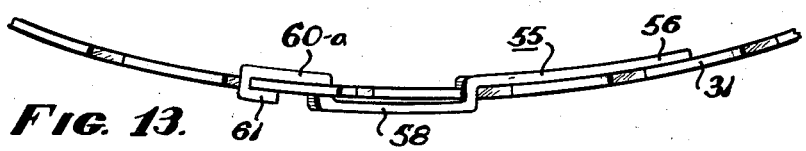
Fig. 13 represents a top plan view like that of Fig. 11 but showing the saddle of Fig. 12.

To overcome this, a somewhat modified form of the saddle of Figures 8–11 may be employed, as shown in Figures 12 and 13.

In this modification, the free edge of the shortened left end portion 60–a is reversely bent and crimped, as at 61, around the transverse leg 44 adjoining the free leg 43–a whereupon the saddle will be permanently installed upon that free end to facilitate assembly of its protruding right end portion 56 with the other free end of the expander strip.

It is apparent that the turned over free end 61 can be readily formed at the same time the shoulders 57 and 59 are formed by any appropriate bending mechanism, after which the saddle can be properly positioned relative to the legs 43–a and 44 and the fastening can be accomplished with any suitable crimping tool.

Figure 9:
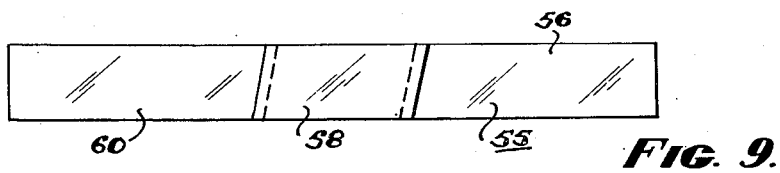
Fig. 9 represents a front elevational view of the embodiment of Fig. 8.

It is obvious, of course, that instead of crimping the edge of the left end portion of the saddle 55, it is possible to leave the left end portion as shown in Figure 9 and, instead, to shorten and crimp over the right end portion so that it is permanently secured to one of the legs 43 or 44 adjoining the end leg 44–a, after which the protruding left end could be assembled with the other free end of the expander spring in a manner analogous to that described hereinabove.

Figure 14:
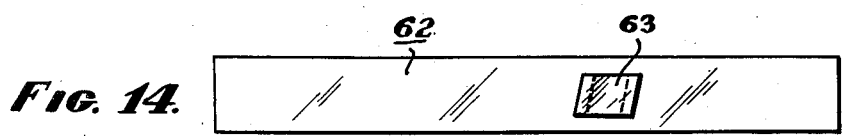
Fig. 14 represents a front elevational view of another form of saddle.
Figure 15:
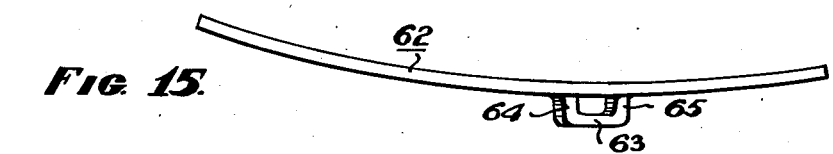
Fig. 15 represents a top plan view of the saddle of Fig. 14.
Figure 16:
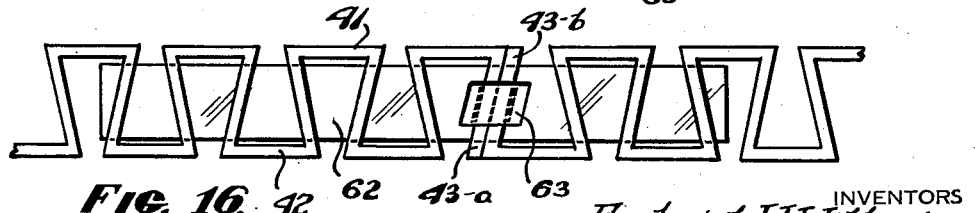
Fig. 16 represents a fragmentary outside elevational view showing an expander employing the saddle of Figs. 14 and 15.
Figure 17:
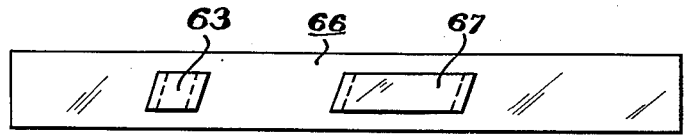
Fig. 17 represents a front elevational view of still another form of saddle.
Figure 18:
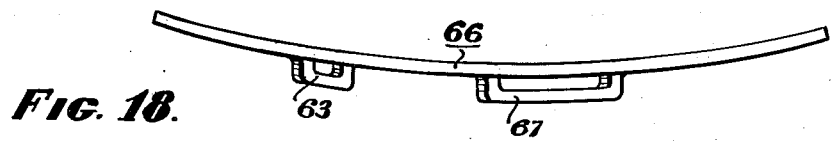
Fig. 18 represents a top plan view of the saddle of Fig. 17.

In Figures 14–16 I have shown a further modified form of the saddle of the present invention. This form of saddle 62, instead of having bent shoulders extending along its transverse dimension (as is the case with the saddles 45 and 55) has an outwardly-protruding portion or yoke 63 which is struck out of only an intermediate portion of the strip, as indicated particularly in Figure 14. As shown more clearly in Figure 15, the yoke portion 63 provides a channel into which can be inserted the juxtaposed free ends of the expander strip, as indicated primarily in Figure 16; the side shoulders 64 and 65 of the yoke portion 63 extending generally parallel and tapered downward from right to left in Figure 14.

In the embodiment of Figures 14–16, the ends of the expander strip are formed somewhat differently. Thus, the free leg 43–a is cut off so that it does not have a fragmentary leg portion 42–a. The other end of the expander strip is cut off with a free axial leg 43–b which is parallel to the free leg 43–a so that it can be placed in juxtaposition thereto within the yoke portion 63 as shown in Figure 16.

The method of assembly in this embodiment is believed to be obvious. Thus, the saddle 62 is first assembled on one of the free ends of the expander strip so that the free axial leg (for example the leg 43–a) extends through the yoke portion 63. Thereafter, the expander spring is positioned within the groove and the protruding portion of the saddle is connected to the other free end of the expander spring; the free leg 43-b being inserted into the yoke portion 63 so that legs 43-a and 43-b fit snugly within the yoke portion 63 and are frictionally held against coming loose.

Figure 19:
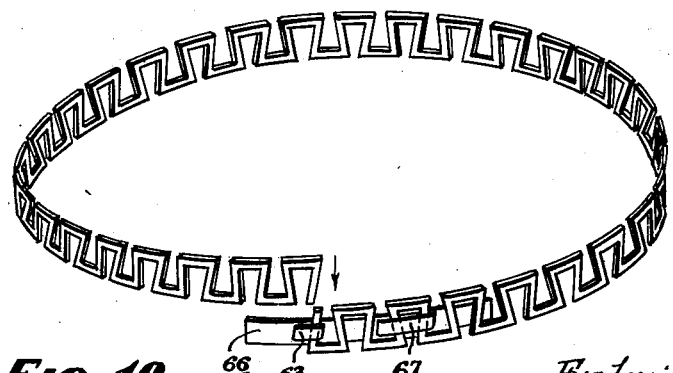
Fig. 19 represents a perspective view showing the manner of assembling an expander employing the saddle of Figs. 17 and 18.

Still another embodiment of the present invention is shown in Figures 17-20. In this embodiment, the expander spring 31 which is similar to that of Figure 16 (in that the free transverse legs 43-a and 43-b are formed without the half-legs 42-a) is provided with still another form of saddle or clip 66. The saddle 66 is provided with a yoke-portion 63 like that of Figure 16, and intended to enclose the juxtaposed legs 43-a and 43-b. The saddle 66 is also provided with an outwardly protruding yoke-portion 67 which is of greater longitudinal dimension than the yoke-portion 63 and which is adapted to fit over and enclose adjoining transverse legs 43 and 44 adjacent one of the free legs 43-b. While the yoke-portion 67 is shown in Figure 19 as fitting over the third and fourth legs from the end leg 43-b, it is apparent that this structure can be modified so as to make the yoke-portion fit over the first and second legs 43 and 44 or the fifth and sixth legs, etc.

Figure 20:
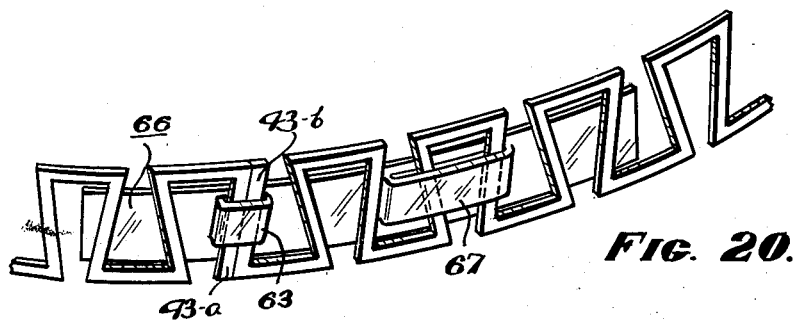
Fig. 20 represents a fragmentary perspective view on an enlarged scale showing the embodiment of Figs. 17–19 in full assembled position.

The method of assembling is believed to be apparent from Figure 19 in which it can be seen that the saddle 66 is first fitted upon one of the free ends of the expander strip (for example by moving the saddle downward relative to the end of the strip) so that it is more or less firmly secured thereon. Thereafter, with the ends of the expander strip held with the fingers (in a manner analogous to that shown in Figure 5), the other free end of the expander strip is moved downward until its transverse leg 43-a enters the smaller yoke-portion 63 and is secured therein to complete the final assembly as shown in Figure 20, after which the outer ring 30 is installed in the manner described above.

In Figures 23 and 24 I have shown still another embodiment of the present invention employing a differently-corrugated expander spring 68 employing longitudinally extending top and bottom legs 69 and transversely extending legs 70. In this embodiment, the corrugations are formed right-angularly so that the transverse legs 70 are parallel to each other; the end legs 70-a being provided with half-legs 69-a.

A saddle or clip 45-a holds the free ends of the expander spring 68 together in the form of a more or less continuous annulus. The saddle 45-a generally resembles the saddle 45 of Figures 6 and 7 except that the shoulders 47-a, 49-a, 51-a and 53-a are formed at right angles to the top and bottom walls of the saddle (instead of being inclined as in the embodiment of Figures 6 and 7).

The saddle 45-a holds the free ends of the expander spring 68 in a manner analogous to that described hereinabove in connection with the embodiment of Figures 1-5 and the manner of installation (including the preliminary affixation to one of the free ends and subsequent connection to the other free end) is believed to be apparent without further elaboration.

In Figures 25 and 26 I have shown a further embodiment of the present invention employing an expander spring 71 which is corrugated in still a different manner and which is provided with a saddle or clip 72 adapted to hold and maintain its ends together to form a more or less continuous annulus. The expander spring 71 is made up of top and bottom legs 73 and transversely-extending legs 74 which are parallel to each other but which are inclined relative to the top and bottom legs; the end legs 74-a having half-legs 73-a formed at their free ends.

The saddle or clip 72 is adapted to lie generally on the inner side of the expander spring but is provided with a bridging-portion 75 which protrudes outwardly so as to pass across the outside of one of the free legs 74-a and its adjoining leg 74 (the side walls 76 of the bridging-portion 75 being inclined so that they fit snugly against the side edges of the transverse legs 74-a and 74) and being provided with a second outwardly-protruding bridging-portion 77 (having similarly inclined side walls 78) which is adapted to enclose a pair of adjoining transverse legs 74 spaced somewhat from the other free leg 74-a.

Thus saddle 72 may first be assembled upon one of the free ends of the expander spring (the bridging-portion 75 serving to maintain it more or less firmly in position), after which the protruding portion of the saddle 72 is engaged with the other free end of the expander spring (by connecting the second bridging-portion 77 with the legs 74).

In Figures 27 and 28 I have shown generally the same expander spring 71 as in Figure 25 (except that the free transverse legs 74-b are formed without the half-legs 73-a) but with a different type of saddle or clip 79.

The saddle 79 is provided with a left-hand bridging-portion 80 (having inclined side walls 81 and adapted to fit over a pair of adjacent transverse legs 74), a central bridging-portion 82 (having parallel inclined side walls 83 adapted to fit over the juxtaposed end legs 74-b) and a right-hand bridging-portion 84 (having inclined parallel side walls 85 adapted to fit over a pair of adjoining legs 74 spaced from the other free leg 74-b).

The saddle 79 can be installed by first attaching it to one of the free ends of the expander-spring (with the bridging-portion 80 positioned relative to the leg 74 and with the bridging-portion 82 fitting over the adjoining free leg 74-b). The protruding portion of the saddle 79 is then connected with the other end of the expander-spring 71 by inserting the other free leg 74-b within the central bridging-portion 82 and simultaneously inserting the adjacent pair of free legs 74 within the bridging-portion 84.

It is apparent that the saddle 62 of Figure 14 could be used, without modification, to fasten the ends of the expander-spring 79 of Figure 27, by inserting the free leg 74-b within the yoke-portion 63.

It is also apparent that the saddles employed with the expander-springs 68 and 71 are subject to various other modifications in the positioning of the bridging or yoke-portions, etc., without departing from the spirit of the present invention.

In Figures 29-32 there is shown still another form of clip 86 which is reversely folded to provide an enlarged head-portion 87 having a longitudinal or circumferential dimension substantially greater than that of one of the oil-drain openings 39 of the non-resilient sheet-metal ring 30 and to provide a reduced neck-portion 88 which is capable of passing radially through one of the openings 39 and also through the expander-springs 31. The clip 86 also includes end-portions or legs 89 and 90 which, as indicated particularly in Figures 31 and 32, are constructed and arranged to be bent so as to pass across the transverse legs 43-a and 44-a of the expander-spring 31 and to extend oppositely along the inner side of the expander-spring 31 so as to maintain the free ends of the expander-spring in position relative to each other and relative to the ring 30; the enlarged head-portion 87 of the clip 86 being positioned axially intermediate the top and bottom cylinder-contacting walls of the ring 30.

The clip of Figures 29-32 provides for extremely simple assembly since it can be preinstalled on the ring 30 by first constructing it in the form of Figure 30-a (wherein the legs 89 and 90 extend generally parallel to each other) and thereafter passing the legs 89 and 90 radially inwardly through one of the oil-drain slots 39 (preferably a slot somewhat spaced from the gap 32 of the ring 30) and thereafter bending the legs 89 and 90 to the final form of Figure 30 with the neck 88 having sufficient radial dimension to permit insertion of the expander-spring 31 intermediate the legs 89 and 90 and the back wall 38 of the ring 30.

It is apparent that the mechanic installing the piston-ring upon a piston and within the cylinder simply has to slip one of the free ends of the expander-spring underneath one of the legs 89 and to lay the spring in along the inside of the ring 30; the other free end of the expander-spring being fitted into position underneath the other clip-leg after the ring has been positioned within the piston-groove.

One of the ends of the expander-spring may, optionally, be pre-fastened to the ring by clamping one of the legs 89 or 90 so as to prevent the underlying free end of the expander-spring from pulling out. If desired, the extreme end of one of the legs 89 or 90 could be bent over (in a manner analogous to the portion 61 shown in Figure 13) so as to pass into one of the oil-drain slots 39, thereby to provide a positive interlock between one end of the expander-spring and the ring 30.

In Figure 33-35 there is shown an expander clip 91 which generally resembles that of Figures 29-32 in operation and mode of assembly but which, in place of the enlarged head 87, simply has a circumferentially-extending portion 92 (which is adapted to be positioned axially intermediate the cylinder-contacting flanges of the ring 30), a pair of radially-inwardly-extending portions 93 and 94 (which are adapted to pass inward through two adjoining oil-drain openings 39 as indicated particularly in Figure 35) and a pair of free end portions or legs 95 and 96 which are adapted to extend along the inner side of the free ends of the expander-spring 31 in the same manner as the legs 89 and 90 of the embodiment of Figure 30, so as to maintain the free ends of the expander-spring in position relative to each other and relative to the ring 30.

In Figs. 36 and 37, there is shown another form of expander-clip 97 which includes an elongated leg portion 98, a relatively short leg portion 99 spaced apart from the leg portion 98 and a connecting neck portion 100.

As shown particularly in Fig. 37, the leg portion 98 is somewhat curved and is adapted to extend along the inner side of the expander-spring 31, so as to overlie the gap formed by the free legs 42-a of said expander-spring 31. The neck portion 100 is constructed and arranged to extend radially through one of the oil-drain openings 39 of the ring 30 and through the expander-spring while the short leg portion 99 is adapted to lie against the outer side of the back or inner wall 38 of the ring 30 so as to lock the connector 97 and one end of the expander-spring 31 to the ring 30.

The free leg 98 tends frictionally to retain the other end of the expander-spring in position so that the legs 42-a are in abutment; the connector-clip being constructed preferably of a somewhat resilient material to give a firmer locking action.

In assembling the piston-ring, expander and clip of Fig. 37, the clip is first placed in position relative to the ring, after which one of the ends of the expander-spring is placed in position intermediate the wall 38 and the leg 98, by moving it axially into position relative to the neck-portion 100 so as to bring the leg 42-a of that end about half way in from the free end of the leg portion 98. Thereafter, the other free end of the expander-spring is moved circumferentially so as to insert it in position from the free end of the leg 98.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, we claim as new and desire to protect by Letters Patent:

1. In a composite oil-control piston-ring including an outer ring of generally U-shaped cross-section having upper and lower cylinder-contacting lands and a back wall provided with a plurality of circumferentially-spaced oil-drain openings, and including an inner non-bottoming expander comprising a strip of resilient sheet-metal or the like which is generally axially-corrugated and which has legs extending alternately generally axially and circumferentially, an integral fastening clip of sheet-metal or the like constructed and arranged to hold the free ends of the expander strip in generally abutting relationship, said clip including a locking portion disposed within said ring axially-intermediate said cylinder-contacting lands, a neck portion extending radially-inwardly therefrom and through one of said oil-drain openings and through said expander and a circumferentially-extending portion disposed on the inside of said expander and overlying the free ends of said expander.

2. In a composite oil-control piston-ring including an outer ring of generally U-shaped cross-section having upper and lower cylinder-contacting lands and a back wall provided with a plurality of circumferentially-spaced oil-drain openings, and including an inner non-bottoming expander comprising a strip of resilient sheet-metal or the like which is generally axially-corrugated and which has legs extending alternately generally axially and circumferentially, an integral fastening clip of sheet-metal or the like constructed and arranged to hold the free ends of the expander strip in generally abutting relationship, said clip including an elongated circumferentially-extending leg portion disposed on the inside of said expander and overlying the free ends, a radially-extending neck portion passing through the expander and through one of the oil-drain openings of said ring, and a circumferentially-extending leg disposed axially-intermediate the cylinder-contacting lands of the ring in juxtaposition to the back wall of said ring.

3. In a composite piston-ring including an outer integral trans-split ring of relatively non-resilient metal or the like having an outer annular cylinder-contacting land and an annular back wall of appreciable axial dimension and including an inner non-bottoming expander constructed and arranged to bear against the back wall of the outer ring and to exert generally uniform circumferentially-distributed outward tension thereon, said expander having alternating upper and lower circumferentially-extending legs in staggered relationship to each other and having intervening generally axially extending legs; a fastening clip constructed and arranged to hold the free ends of the expander strip in generally abutting relationship thereby to maintain the expander in the form of a closed annulus, said fastening clip comprising an elongated strip of thin flat sheet-metal or the like having a transverse dimension somewhat less than the axial distance between the upper and lower circumferentially extending legs of the expander strip, said fastening clip being bent to provide at least one portion extending radially through the expander axially intermediate the upper and lower circumferentially-extending portions disposed on opposite sides of said expander strip, one of said circumferentially-extending portions extending across and bearing against the abutting free ends of the expander strip and tending to prevent separation thereof.

4. A construction according to claim 3 wherein the fastening clip is generally J-shaped with a relatively short circumferentially-extending portion disposed on one side of the expander strip and a relatively long circumferentially-extending portion disposed on the other side of the expander strip and bridging the abutting free ends thereof.

5. A construction according to claim 3 wherein the outer ring is generally U-shaped in cross-section and has a plurality of circumferentially-spaced oil-drain openings formed in its back wall and wherein the radially-extending portion of the fastening clip extends through one of the oil-drain openings as well as through the expander strip and wherein one of the circumferentially-extending portions of the fastening clip is disposed on the outer side of the back wall of the outer ring and the other circumferentially-extending portion is disposed on the inner side of the expander strip whereby the fastening clip also serves to lock the expander strip to the outer ring.

6. A construction according to claim 3 wherein the outer ring has a plurality of circumferentially-spaced oil-drain openings formed in its back wall and wherein the fastening clip is generally J-shaped with a relatively short leg hooked inside one of said oil-drain openings and with a relatively long circumferentially-extending leg bearing against the inner side of the expander strip and bridging the abutting free ends thereof.

7. A construction according to claim 3 wherein the outer ring is generally U-shaped in cross-section and has a plurality of circumferentially-extending oil-drain openings formed in its back wall and wherein the fastening clip has a circumferentially enlarged portion disposed on the outer side of the back wall and a pair of circumferentially spaced portions extending radially through said oil-drain openings and through the expander-strip and a pair of oppositely-directed circumferentially-extending portions bearing against the inner side of the expander strip.

8. A construction according to claim 3 wherein the outer ring is generally U-shaped in cross-section and has a plurality of circumferentially-extending oil-drain openings formed in its back wall and wherein the fastening clip has a circumferentially enlarged portion disposed on the outer side of the back wall of the outer ring and a pair of circumferentially spaced portions extending radially through one of said oil-drain openings and also extending through the expander-strip on either side of the abutting free ends thereof and has a pair of oppositely-directed circumferentially - extending portions bearing against the inner side of the expander strip.

9. A construction according to claim 3 wherein the outer ring is generally U-shaped in cross-section and has a plurality of circumferentially-spaced oil-drain openings formed in its back wall and wherein the fastening clip has a circumferentially-extending portion disposed on the outer side of the back wall of the outer ring and has a pair of radially-extending portions passing through separate oil-drain openings and also passing through the expander strip on opposite sides of the abutting free ends and has a pair of oppositely-directed circumferentially-extending portions bearing against the inner side of the expander strip.

10. A construction according to claim 3 wherein the fastening clip includes a circumferentially-extending portion disposed on the outer side of the expander strip and includes a pair of radially-extending portions passing through the expander strip on opposite sides of the abutting free ends and includes a pair of oppositely-directed circumferentially-extending portions formed at the inner ends of the radially extending portions and bearing against the inner side of the expander strip.

11. A construction according to claim 10 wherein the free end of one of the circumferentially-extending portions of the fastening clip is again bent radially outward to pass through the expander strip, with the extreme tip bent circumferentially so as to hook around one of the generally axially extending legs of the expander strip.

12. A construction according to claim 3 wherein the fastening clip includes an elongated circumferentially-extending portion disposed on the inner side of the expander strip and extending a substantial distance on both sides of the abutting free ends of the expander strip and includes a more or less continuous loop of reduced axial dimension struck out of the inner circumferentially-extending portion, said loop including a pair of outwardly-extending radial portions and an outer integrally-formed portion of relatively small circumferential dimension.

FREDERICK W. WILKENING.
HELMUTH G. BRAENDEL.
CARL F. ENGELHARDT.

REFERENCES CITED

The following references are of record in the file of this patent:

UNITED STATES PATENTS

| Number | Name | Date |
| --- | --- | --- |
| 703,590 | Johnson | July 1, 1902 |
| 1,173,727 | Mickley | Feb. 29, 1916 |
| 1,767,711 | Solenberger | June 24, 1930 |
| 2,281,123 | Teetor | Apr. 28, 1942 |
| 2,285,961 | Finley | June 9, 1942 |
| 2,293,450 | Wilkening | Aug. 18, 1942 |
| 2,439,702 | Teetor | Apr. 13, 1948 |
| 2,452,503 | Teetor | Oct. 26, 1948 |